United States Patent
Bush et al.

(10) Patent No.: US 11,148,753 B2
(45) Date of Patent: Oct. 19, 2021

(54) SPROCKET ASSEMBLY

(71) Applicant: SRAM, LLC, Chicago, IL (US)

(72) Inventors: Matthew Bush, San Luis Obispo, CA (US); Jorge Latimer, San Luis Obispo, CA (US); Daniel Humes, San Luis Obispo, CA (US)

(73) Assignee: SRAM, LLC, Chicago, IL (US)

( * ) Notice: Subject to any disclaimer, the term of this patent is extended or adjusted under 35 U.S.C. 154(b) by 266 days.

(21) Appl. No.: 15/849,080

(22) Filed: Dec. 20, 2017

(65) Prior Publication Data

US 2019/0185108 A1  Jun. 20, 2019

(51) Int. Cl.
*B62M 9/10* (2006.01)
*F16H 55/12* (2006.01)
*F16H 55/30* (2006.01)

(52) U.S. Cl.
CPC ............ *B62M 9/105* (2013.01); *F16H 55/12* (2013.01); *F16H 55/30* (2013.01)

(58) Field of Classification Search
CPC .......... B62M 9/105; F16H 55/12; F16H 55/30
See application file for complete search history.

(56) References Cited

U.S. PATENT DOCUMENTS

| | | |
|---|---|---|
| 5,273,495 A | 12/1993 | Nagano |
| 5,480,359 A | 1/1996 | Tani |
| 5,946,982 A | 9/1999 | Schmidt |
| 6,443,865 B1 * | 9/2002 | Yamanaka ............... B62J 13/00 474/144 |
| 7,861,599 B2 | 1/2011 | Meggiolan |
| 9,771,128 B2 | 9/2017 | Sugimoto et al. |
| 2005/0282672 A1 | 12/2005 | Nonoshita |
| 2008/0161145 A1 * | 7/2008 | Shiraishi .................. B62J 13/00 474/145 |
| 2008/0161146 A1 * | 7/2008 | Shiraishi .................. B62M 9/12 474/160 |
| 2010/0050810 A1 | 3/2010 | Nakatani et al. |
| 2013/0087012 A1 * | 4/2013 | Sugimoto ................ B62M 3/00 74/594.2 |
| 2018/0229793 A1 * | 8/2018 | Cody ....................... F16H 55/30 |

* cited by examiner

*Primary Examiner* — Minh Truong

(57) ABSTRACT

A sprocket assembly for a bicycle includes at least one alignment member configured to align components of the sprocket assembly about a rotation axis. The alignment member interacts with an engagement member to axially engage components of the sprocket assembly. The engagement member may be configured with features to stop rotation relative to components of the sprocket assembly.

18 Claims, 11 Drawing Sheets

SPROCKET ASSEMBLY

BACKGROUND OF THE INVENTION

A bicycle may be equipped with a sprocket assembly, such as a front or drive sprocket assembly. Sprocket assemblies may be used to transmit torque from a rider to a rear wheel and propel the bicycle forward. For example, a sprocket assembly may transmit torque through a chain to a rear sprocket arrangement attached to the rear wheel.

Sprocket assemblies for bicycles may contain one or more individual sprockets. Drive sprockets are commonly referred to as chainrings. Chainrings may be attached with various attachment devices. Threaded attachment devices commonly referred to as chainring bolts are sometimes employed.

Threaded attachment devices may be used to attach and/or align one or more sprockets. Sprocket alignment is important for functional operation of the bicycle. In particular, misalignment of sprockets may lead to difficult shifting, chain derailment, and/or premature wear of components. Sprockets may have one or more shifting or other features. These features are typically constructed to operate based on particular alignment of chainrings relative to each other.

Alignment of sprockets about an axis may also be useful to maintain a consistent effective gear ratio. For instance, a misaligned sprocket may have teeth disposed at different radial distances from the axis. In this case, a sprocket with a circular root base may have shorter and longer moment arms from the axis to the tooth depending on rotational position.

Sprocket assemblies also benefit from being lightweight and of relatively low complexity. It is advantageous to provide an effectively aligned, lightweight, and relatively simple sprocket assembly.

SUMMARY

One aspect of the invention provides a sprocket assembly for a bicycle. The sprocket assembly has a first sprocket configured for rotation about a rotation axis of the bicycle. An attachment member is disposed outboard of the first sprocket. A second sprocket is disposed inboard of the first sprocket. A plurality of alignment members are engaged with the attachment member through a plurality of first openings in the first sprocket and a plurality of second openings in the second sprocket. Each of the plurality of alignment members comprises an alignment feature configured to radially engage one each of the plurality of first openings and the plurality of second openings.

Another aspect of the invention provides a sprocket assembly for a bicycle. The sprocket assembly has a first sprocket having a first opening. The first opening has an outboard surface and an inboard surface. A second sprocket is disposed inboard of the first opening. An alignment member has a first portion having a first diameter, a second portion having a second diameter greater than the first diameter, a third portion having a third diameter greater than the second diameter, and a transition disposed between the first portion and the second portion. An attachment member outboard of the first opening has an inboard engagement portion axially engaged with the first sprocket and an engagement member opening engaged with the alignment member. The transition is disposed between the inboard surface and the outboard surface, and the third portion is axially engaged with the second sprocket.

Yet another aspect of the invention provides a sprocket assembly for a bicycle. The sprocket assembly has an alignment member. A first sprocket has a first opening. At least one of attachment member is disposed outboard of the first opening. The attachment member has an engagement member embedded therein. The engagement member has at least one of an anti-rotation feature sized and shaped to stop rotation of the engagement member relative to the attachment member. The alignment member passes through the first opening and engages the engagement member.

BRIEF DESCRIPTION OF THE DRAWINGS

Other aspects and advantages of the embodiments disclosed herein will become apparent upon consideration of the following detailed description, wherein similar or identical structures have similar or identical reference numerals.

DETAILED DESCRIPTION

A sprocket assembly configured to effectively align is advantageous to the operation of a bicycle. Such a sprocket assembly that is lightweight, robust, and simple may improve bicycle performance and reduce the need for service. A sprocket assembly may be configured to address these needs.

Figure 1:
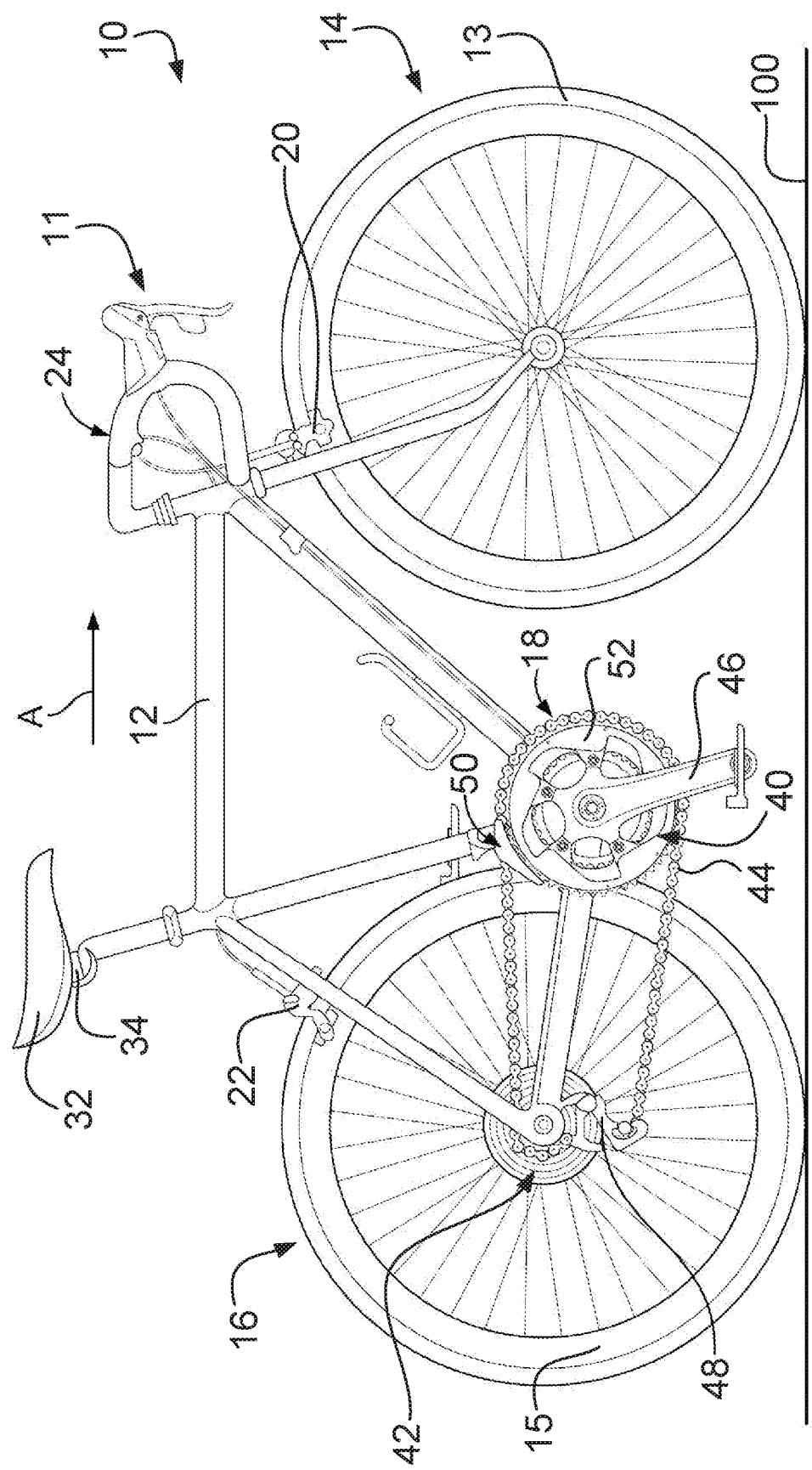
FIG. 1 is a side view of a road-type bicycle implementing a sprocket assembly.

FIG. 1 generally illustrates a bicycle 10 of a road-type configuration including a sprocket assembly 40. The bicycle 10 includes a frame 12, front and rear wheels 14, 16 rotatably attached to the frame 12, and a drivetrain 18. A front brake 20 is provided for braking the front wheel 14 and a rear brake 22 is provided for braking the rear wheel 16. Each of the front and rear wheels 14, 16 includes a tire 13 attached to a rim 15, where the tire 13 is configured to engage the riding surface 100. A handlebar assembly 24 is provided for steering the front wheel 14. The direction of arrow "A" indicates a front and/or forward orientation of the bicycle 10. As such, a forward direction of movement for the bicycle 10 corresponds to the direction A.

Other configurations of the bicycle 10 are contemplated. For instance the bicycle 10 may have a mountain-type configuration. Potential differences between bicycles of various configurations include those between mountain and road type bicycles. For example, FIG. 1 depicts the handlebar assembly 24 in a drop-type configuration, whereas a mountain type example may have a flat-type configuration of the handlebar assembly 24. A mountain type configuration may also include various other features such as suspension.

FIG. 1 depicts the drivetrain 18 including a sprocket assembly 40 rotatably mounted to the frame 12, a rear sprocket assembly 42 mounted to the rear wheel 16, and a chain 44 engaging the sprocket assembly 40 and the rear sprocket assembly 42. The sprocket assembly 40 may be attached to a crank arm 46 to facilitate torque transfer from a rider to the rear wheel 16 through the sprocket assembly 40, to the chain 44, and to the rear sprocket assembly 42. The chain 44 may be shifted through a plurality of sprockets of the rear sprocket assembly 42 with a rear gear changer 48. The chain 44 may also be shifted through a plurality of sprockets of the sprocket assembly 40 with a front gear changer 50.

Figure 2:
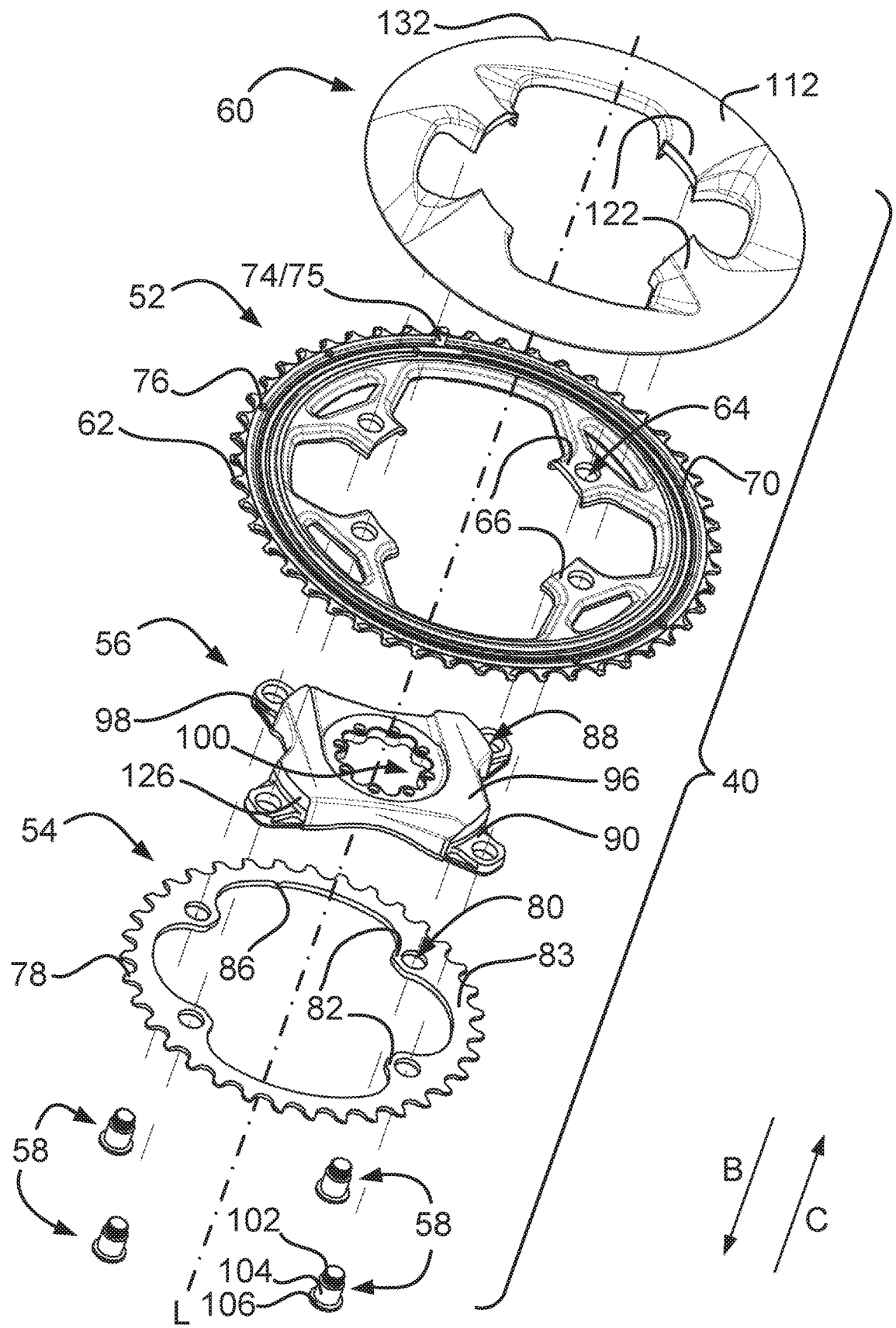
FIG. 2 is an exploded isometric view of a sprocket assembly.
Figure 3:
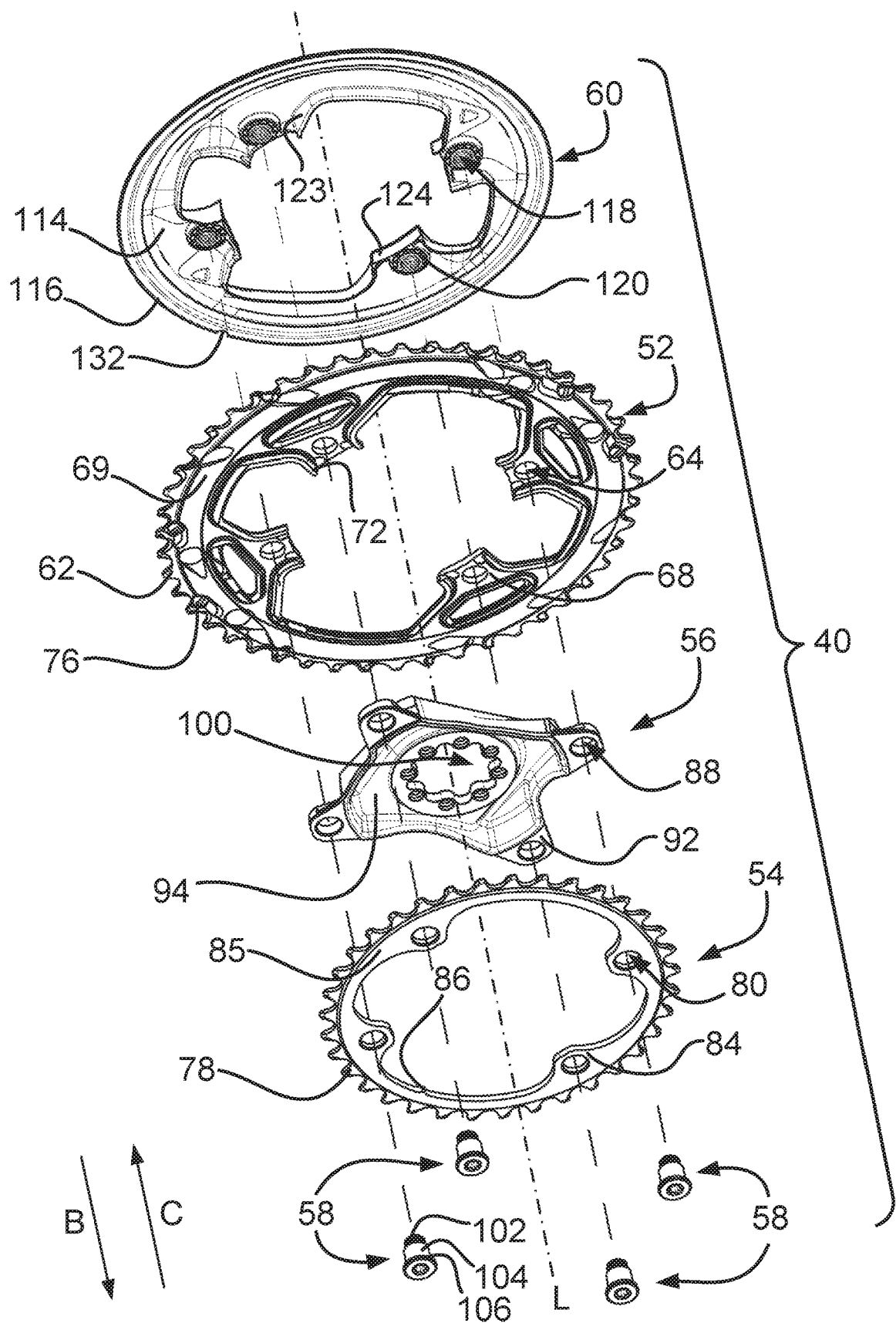
FIG. 3 is an alternate isometric view of the exploded view of FIG. 2.

FIG. 2 shows an exploded view of the sprocket assembly 40 from an outboard perspective. FIG. 3 shows an exploded view of the sprocket assembly 40 from an inboard perspective. An inboard direction B and an outboard direction C are indicated. The inboard and outboard directions B, C relate to relative positioning of components along an axis L. The axis L is a rotation axis about which components rotate relative to the frame 12.

The sprocket assembly 40 is shown as having a first sprocket 52, a second sprocket 54, a carrier 56, one or more of an alignment member 58, and an attachment member 60. The sprocket assembly 40 may include a plurality of alignment members 58. The sprocket assembly 40 may comprise additional, different, or fewer components. For example, the second sprocket 54 may be omitted. Alternatively, the second sprocket 54 may be integrally formed with the first sprocket 52. The carrier 56 may also be omitted. For example, features of the carrier 56 may be incorporated into at least one of the first sprocket 52 and the second sprocket 54.

The first sprocket 52 is shown having a plurality of first teeth 62 configured to engage the chain 44. The first sprocket 52 may also be known as an outer sprocket or a large chainring. Each of the plurality of first teeth 62 may be uniform with each other, or individual teeth may have differences. For example, some of the plurality of first teeth 62 may include chain shifting or chain retention features configured to facilitate shifting or resist derailment of the chain 44. As a further example, every alternating tooth may have a greater thickness than every adjacent tooth of the plurality of first teeth 62 to accommodate a roller chain having inner and outer links of differing internal widths.

The first sprocket 52 is further shown to include a one or more of a first opening 64. The first sprocket 52 may include a plurality of first openings 64. Each of the plurality of first openings 64 shown is bounded by an outboard first opening surface 66 and an inboard first opening surface 68. The inboard first opening surface 68 may be formed as part of an inboard first surface 69 of the first sprocket 52. The inboard and outboard first opening surfaces 66, 68 may be configured for axial engagement with other components. For example, installation of the plurality of alignment members 58 may urge the first sprocket 52 and the second sprocket 54 together such that the inboard first opening surface 68 axially engages with the second sprocket 54. The axial engagement may be direct or indirect. For example, a surface of the first sprocket 52 may axially engage with a surface of the second sprocket 54 through surfaces of the carrier 56.

The first sprocket 52 is also shown to include an outboard engagement portion 70. The outboard engagement portion 70 is indicated in FIG. 2 as a portion radially outward relative to the first openings 64. The outboard engagement portion 70 may also be at least partially radially inward of the first openings 64. For example, the outboard first opening surface 66 may form at least part of the outboard engagement portion 70. The outboard engagement portion is configured to engage the attachment member 60. For example, installation of the plurality of alignment members 58 with the attachment member may urge the outboard engagement portion 70 towards the attachment member 60 such that there is axial engagement therebetween. The outboard engagement portion 70 may axially engage with the attachment member 60 directly or indirectly. For example, an elastomeric and/or adhesive layer may be disposed between the outboard engagement portion 70 and the attachment member 60.

The first sprocket 52 may also include one or more of a first alignment contour 72. The first alignment contour 72 may be configured to align or aid in alignment of the first sprocket 52 with other components. For example, the first alignment contour 72 may interact with the carrier 56 during assembly of the sprocket assembly 40. This interaction may align or nearly align the first sprocket 52 with one or more other components or other elements. For example, the interaction may be configured to alight the first sprocket to the rotational axis L The first sprocket 52 may be formed using various techniques to achieve any or all of the above features. In an embodiment, metal may be bent or otherwise deformed to form described features. For example, the first sprocket 52 may be stamped or extruded. The first sprocket may also be formed using additional, or alternative, techniques, such as machining, forging, molding, material deposition, casting, and/or created by another suitable method. Different combinations of these techniques may also be used. For example, a thin metal sheet may be deformed through stamping to form some features, such as carrier alignment contours and/or sections, and have other features formed through machining or other material removal processes, such as the first or other openings. Certain configurations of the first sprocket 52 may have comparative advantages in certain situations. For example, a stamped configuration of the first sprocket 52 may provide relatively high stiffness at relatively low variable cost. Other configurations of the first sprocket 52 may be more aerodynamic and/or aesthetically pleasing. A stamped configuration of the first sprocket 52 may be combined with an aesthetically pleasing and/or aerodynamic configuration of the attachment member 60 configured to cover a relatively large portion of the first sprocket in an installed state.

The first sprocket 52 may also include one or more of an anti-derailment feature 74. The anti-derailment feature 74 may be included to prevent the chain 44 from jamming between the crank arm 46 and the first sprocket 52 in the case of derailment. The anti-derailment feature 74 may alternatively be formed with the attachment member 60. For example, the attachment member may be sized and shaped to stop the chain 44 from moving radially inward between the crank arm 46 and the first sprocket 52 to a radial location where the gap therebetween is less than the external width of the chain 44.

The first sprocket 52 may also include a first circumferential alignment feature 75. As shown, the first circumferential alignment feature 75 is the same component as the anti-derailment feature 74. The first circumferential alignment feature 75 may be used to align the first sprocket 52 with other components. Circumferential alignment may also be referred to as clocking. Components may be configured for a certain rotational alignment, for example to facilitate interaction between one or more of the first shift feature 76 of the first sprocket 52 and one or more of a corresponding shift feature (not shown) of the second sprocket 54. Rotational alignment of at least one of the first sprocket 52 and the second sprocket 54 relative to the crank arm 46 may facilitate appropriate arrangement of sprocket features such as differentially-wearing materials or non-circularity. The first circumferential alignment feature 75 may also be a distinct component from the anti-derailment feature 74. For example, the first circumferential alignment feature 75 may be an inward radial protrusion.

The first sprocket 52 may also include one or more of a first shift feature 76. The first shift feature 76 may be included to aid in shifting the chain 44 from one of the sprockets 52, 54 to another of the sprockets 54, 52. The first shift feature 76 may also radially engage and/or axially engage the attachment member 60. For example, a first diameter of a plurality of the first shift feature 76 may be less than a diameter of the attachment member 60 such that the attachment member 60 deformably fits therein. One or more of the plurality of the first shift features 76 may also have a recess (not shown) with a second diameter greater than the first diameter such that the attachment member 60 non-deformably fits therein and is axially constrained by the outboard engagement portion 70 and the first shift feature 76.

The second sprocket 54 is shown as having a plurality of second teeth 78 configured to engage the chain 44. The second sprocket 54 may also be known as an inner sprocket or a smaller chainring. Each of the plurality of second teeth 78 may be uniform with each other, or individual teeth may have differences. For example, some of the plurality of second teeth 78 may include chain shifting or chain retention features configured to facilitate shifting or resist derailment of the chain 44. As a further example, every alternating tooth may have a greater thickness than every adjacent tooth of the plurality of second teeth 78. The second teeth 78 may be configured similarly to the first teeth 62 or may be differently configured. For example, the first teeth 62 may incorporate one or more of the first shift feature 76 while the second teeth 78 may not.

The second sprocket 54 is further shown to include one or more of a second opening 80. In an embodiment, the second sprocket includes a plurality of second openings. Each of the plurality of second openings 80 is shown bounded by an outboard second opening surface 82 and an inboard second opening surface 84. The outboard second opening surface 82 may be formed as part of an outboard second surface 83 of the second sprocket 54 and/or the inboard second opening surface 84 may be formed as part of an inboard second surface 85 of the second sprocket 54. The outboard and inboard second opening surfaces 82, 84 may be configured for axial engagement with other components. For example, installation of the plurality of alignment members 58 may urge the first sprocket 52 and the second sprocket 54 together such that the inboard first opening surface 68 of the first sprocket 52 axially engages with the outboard first opening surface 82 of the second sprocket 54. The axial engagement may be direct or indirect. For example, the inboard first opening surface 68 of the first sprocket 52 may axially engage with the outboard second opening surface 82 of the second sprocket 54 directly or through the carrier 56.

The first and second openings 64, 80 may be configured for passage of the plurality of alignment members 58 therethrough. For example the first and second openings 64, 80 may be of a smooth and/or radially uniform configuration. In an embodiment, the first and second openings 64, 80 are formed without internal securing features, such as female threading.

The second sprocket 54 is also shown to include a second circumferential alignment feature 86. The second circumferential alignment feature 86 may facilitate relative rotational alignment in a similar manner to the first circumferential alignment feature 75. As shown, the second circumferential alignment feature 86 is an inward radial protrusion. However, at least one of the first circumferential alignment feature 75 and the second circumferential alignment feature 86 may be otherwise configured. For example, the sprocket assembly 40 may be sized and shaped so that installation is only possible for a limited number of possible relative rotational alignments of components. In one embodiment, the sprocket assembly 40 may be configured so that installation is only possible for one relative rotational alignment of components. For example, installation may permit only one alignment of one of the first shift features 76 of the first sprocket 52 with one of the second teeth 78 of the second sprocket 54.

The carrier 56 may have one or more of a third opening 88. The third opening 88 may also be of a smooth and/or radially uniform configuration and may also lack internal securing features such as female threading. The one or more of the third opening 88 is shown as a plurality of third openings 88. Each of the four (4) shown third openings 88 is bounded by an outboard third opening surface 90 and an inboard third opening surface 92. The inboard third opening surface 92 may be formed as part of an inboard third surface 94 of the carrier 56. Alternatively, the inboard third opening surface 92 and the inboard third surface 94 may be axially separated surfaces of the carrier 56. The outboard third opening surface 90 may be formed as part of an outboard third surface 96 of the carrier 56. Alternatively, the outboard third opening surface 92 and the outboard third surface 96 may be axially separated surface of the carrier 56.

The inboard and outboard third opening surfaces 90, 92 may be configured for axial engagement with other components. For example, installation of the plurality of alignment members 58 may urge the first sprocket 52 and the second sprocket 54 together such that the inboard first opening surface 68 axially engages with the outboard third opening surface 90 and the outboard second opening surface 82 axially engages with the inboard third opening surface 92. Thus, the first sprocket 52 may be axially engaged with the second sprocket 54 with the carrier 56 disposed therebetween.

The carrier 56 may also include one or more of a third alignment contour 98. The third alignment contour 98 may be configured to align or aid in alignment of the carrier 56 with other components. For example, the third alignment contour 98 may interact with the first alignment contour 72 of the first sprocket 52 during assembly of the sprocket assembly 40. This interaction may align or nearly align the first sprocket 52 the carrier 56. In one case of alignment, interaction between the first alignment contour 72 and the third alignment contour 98 determines the relative rotational positions of the first sprocket 52 and the carrier 56 when the inboard first opening surface 68 is axially engaged with the outboard third opening surface 90. In one case of near alignment, interaction between the first alignment contour 72 and the third alignment contour 98 facilitates installation of another component, such as one of the plurality of alignment members 58, which then determines the relative rotational positions of the first sprocket 52 and the carrier 56 when the inboard first opening surface 68 is axially engaged with the outboard third opening surface 90.

The carrier 56 may also include a crank engagement portion 100. The crank engagement portion 100 is configured to interact with the crank arm 46. In one embodiment, the carrier 56 and the crank arm 46 are a unitary component. In the embodiment shown, the carrier 56 is detachable from the first sprocket 52, the second sprocket 54, and the crank arm 46 such that each may be replaced independently of each other. In another embodiment, the carrier 56 may be formed with at least one of the first sprocket 52 and the second sprocket 54 as a unitary component.

Although the pluralities of openings 64, 80, 88 are shown as sets of four (4) openings, there may be additional or fewer openings. For example, five (5) of each of the pluralities of openings 64, 80, 88 may be used. The openings 64, 80, 88 may be evenly spaced about the axis L or may be asymmetrically spaced.

As in FIGS. 2 and 3, the sprocket assembly 40 is shown to include four (4) of the plurality of alignment members 58. More or fewer alignment members 58 may be provided. For example, a possible configuration may include five (5) of the plurality of alignment members 58. Each one of the plurality of alignment members 58 is configured to align at least one of the first and second sprockets 52, 54. One or more of the plurality of alignment members 58 may be further configured to align other components. For instance, the plurality of alignment members 58 may be configured to align the first sprocket 52, the second sprocket 54, and the carrier 56.

The plurality of alignment members 58 is configured to attach to another component of the sprocket assembly 40. For example, the plurality of alignment members 58 may be configured to attach to the attachment member 60.

Figure 5:
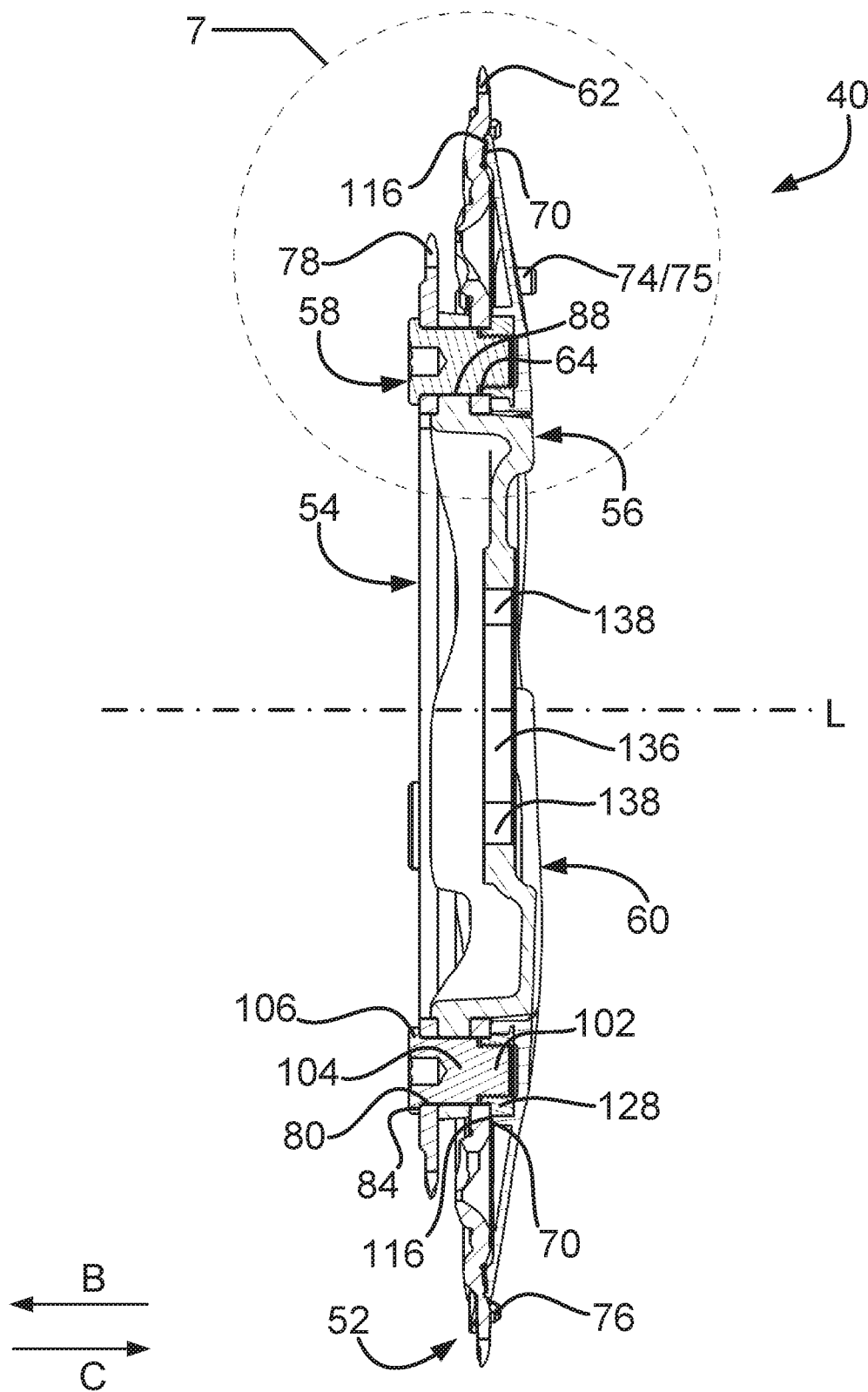
FIG. 5 is a sectional view of the sprocket assembly of FIG. 2, taken along section line X-X of FIG. 4.

The plurality of alignment members 58 and the attachment member 60 are shown to axially interact, for example in FIG. 5. This axial interaction may be a direct threaded interaction. In the shown embodiment, the plurality of alignment members 58 and the attachment member 60 axially constrain the first sprocket 52, the second sprocket 54, and the carrier 56. In such a way, the plurality of alignment members 58 may axially engage, directly or indirectly, with at least one of the first sprocket 52, the second sprocket 54, the carrier 56, and the attachment member 60.

Referring again to FIGS. 2 and 3, each of the plurality of alignment members 58 may include portions having different diameters. For example, as shown in detail in FIG. 9, at least one of the plurality of alignment members 58 may include a first portion 102 having a first diameter P and a second portion 104 having a second diameter Q. The first portion 102 may be configured to axially engage with the attachment member 60. For example, the first portion 102 may have male threads configured for interaction with female threads of the attachment member 60. In this example, the first diameter P represents an outer thread diameter, while an inner thread diameter T represents the diameter of the threading cut, rolled, or otherwise provided in the first portion 102.

The second diameter Q may be greater than or equal to the first diameter P. For example, the second diameter Q may represent a diameter of an annular shoulder configuration of the second portion 104. The second portion 104 may be otherwise configured. For instance, the second portion 104 may be hexagonal or otherwise polygonal, in which case the second diameter Q represents a diameter circumscribing the outer bounds of the second portion 104.

Each of the plurality of alignment members 58 may also include a third portion 106 having a third diameter R. The third diameter R may be larger than the second diameter Q. The third portion 106 may be configured to axially engage with one or more component s of the sprocket assembly 40. In an embodiment, the third portion 106 may axially interact with the inboard second opening surface 84.

Figure 7:
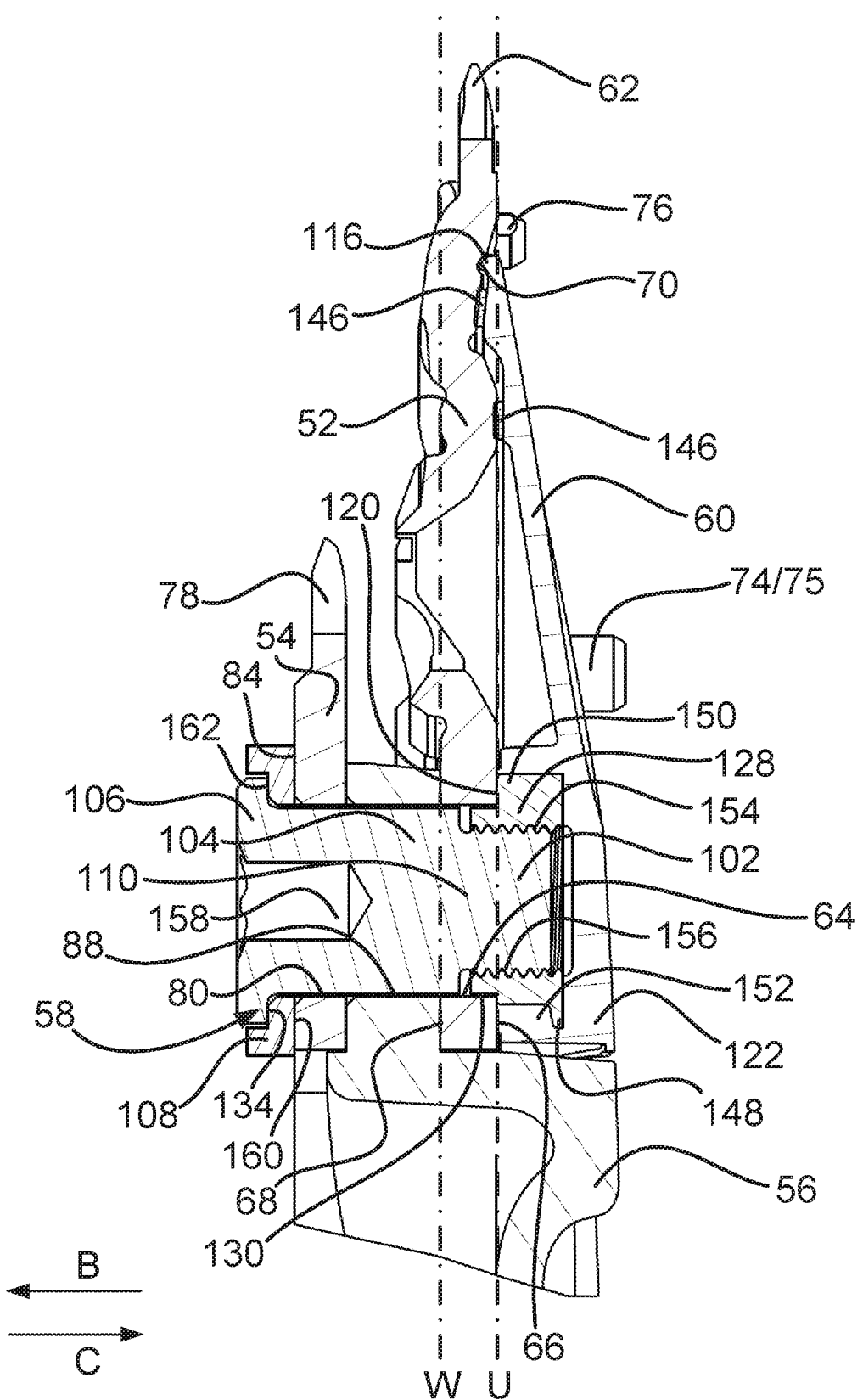
FIG. 7 is an enlarged sectional view similar to that of FIG. 6, of an alternative embodiment of a sprocket assembly

Axial engagement between the third portion 106 and another component may be direct or indirect. For example, the third portion 106 may indirectly axially engage with the carrier 56 through direct axial engagement with the inboard second opening surface 84 of the second sprocket 54 and direct axial engagement between the outboard second opening surface 82 of the second sprocket 54 and the inboard third opening surface 92 of the carrier 56. Other axially intermediate components may be provided. For example, an intermediate member 108, as shown in FIG. 7, may be provided axially between the third portion 106 and the inboard second opening surface 84. The intermediate member 108 may be a washer or other device and may be configured to distribute load or provide a locking function.

At least a portion of each of the plurality of alignment members 58 may be configured to radially engage with one or more other components of the sprocket assembly 40. For example, the second portion 104 may be configured to radially engage with at least one of the first, second, and third openings 64, 80, 88. Such radial engagement may occur when installed or during installation. In an embodiment, the alignment members 58 radially engage two or more of the openings. For example, radial engagement of the plurality of alignment members 58 with the first and second, openings 64, 80 may facilitate installation. The third opening 88 may also be engaged. For instance, the rotational alignment, also known as the clocking, of the first and second sprockets 52, 54 may be constrained by radial engagement of the plurality of alignment members 58 with the first and second openings 64, 80.

Radial engagement of various components with the second portion 104 may avoid complications in radial engagement with the first portion 102. For example, in a threaded configuration of the first portion 102, radial engagement, especially radial torque transfer, may damage threading thereof. Radial engagement of the second portion 104, which may be smooth or of an otherwise non-threaded configuration, may be less susceptible to damage of either the alignment member 58 or components engaged therewith.

To facilitate installation, the plurality of alignment members 58 may be clearance fit within at least one of the first, second, and third openings 64, 80, 88. Clearance between one of the plurality of alignment members 58 and the corresponding first, second, and/or third openings 64, 80, 88 may be limited to appropriately constrain the alignment between the first and second sprockets 52, 54. If such a clearance is sufficiently limited, then installation of the plurality of alignment members 58 may align the first and second sprockets 52, 54 within acceptable tolerances. Unacceptable tolerances may cause improper shifting interaction of the chain 44 between the first and second sprockets 52, 54 or may cause the bicycle to exhibit variable effective gear ratios as the distance of the chain 44 from the axis L changes throughout rotation of the sprocket assembly 40. Improper shifting interaction may include misalignment of various shift features or too short or too great a radial distance between aligned first and second teeth 62, 78.

The plurality of alignment members 58 may be configured such that certain portions thereof extend through one or more components of the sprocket assembly 40 in the installed state. In an embodiment, at least one of the plurality of alignment members has a second portion 104 that extends through at least the first sprocket and the second sprocket. For example, each of the plurality of alignment members 58 may be configured such that the second portion 104 extends through the first, second, and third openings 64, 80, 88. One or more of the plurality of alignment members 58 may also be configured such that the second portion 104 is recessed inboard of the outboard first opening surface 66. The first portion 102 may also extend into the first opening 64 such that the first portion 102 and the second portion 104 are each partially disposed between the outboard first opening surface 66 and the inboard first opening surface 68.

A transition 110 may be defined between the first portion 102 and the second portion 104 of the alignment member 58. The transition 110 may be a portion, having an axial dimension, of one of the plurality of alignment members 58 or else may be defined by a plane containing the transition. In an embodiment, the transition 110 is disposed axially within the first opening 64 or between the outboard first opening surface 66 and the inboard first opening surface 68.

The alignment member 58 may also include a chamfer 165. The chamfer 165 may be included for ease of tool engagement, for instance in the case of an external tooling configuration of the alignment member 58. The chamfer 165 may also be provided for weight saving, aerodynamic, or non-interference considerations.

In an embodiment, the alignment member 58 may be bolt. For example, the first portion 102 may be a threaded portion of a bolt, the second portion 104 may be a shoulder portion of the bolt, and the third portion 106 may be a head portion of the bolt. The transition 110 may include a radius or relief cut in the bolt.

Referring again to FIGS. 2 and 3, the sprocket assembly 40 is shown as including the attachment member 60. The attachment member 60 is shown as having an outboard attachment portion 112 and an inboard attachment portion 114. The inboard attachment portion 114 may include one or more of an inboard engagement portion 116. The inboard engagement portion 116 may be configured to interact with another component of the sprocket assembly 40. For example, the inboard engagement portion 116 may axially engage with the outboard engagement portion 70 of the first sprocket 52. This axial engagement may be direct or indirect. For example, there may be an adhesive and/or elastomeric component disposed between the inboard engagement portion 116 and the outboard engagement portion 70 configured to secure components and/or damp vibration of the sprocket assembly 40.

The attachment member 60 may be secured to other components of the sprocket assembly 40 in various and multiple ways. For example, the attachment member 60 may be adhesively mounted to the first sprocket 52. Alternatively or additionally, the attachment member may be secured by one or more of the shift feature 76.

As shown in FIG. 3, the attachment member 60 may also be secured through one or more of a fourth opening 118. The fourth opening 118 may also be known as an engagement member opening. The one or more of the fourth opening 118 may be a plurality of fourth openings. Each of the fourth opening 118 is shown as a blind hole configuration, however, a through hole configuration is also contemplated. Each of the plurality of fourth openings 118 is also shown as having an inboard fourth opening surface 120. In a through hole configuration, an outboard fourth opening surface (not shown) may also be included.

The inboard fourth opening surface 120 may axially engage the first sprocket 52. In one embodiment, the inboard fourth opening surface 120 forms part of the inboard engagement portion 116. Alternatively, the inboard fourth opening surface 120 may be spaced apart from the first sprocket 54. For example, a configuration of the inboard engagement portion 116 distinct from the inboard fourth opening surface 120 may axially engage with the first sprocket 52 while installation of the plurality of alignment members 58 urges the inboard fourth opening surface 120 closer to the first sprocket 52 by deforming the attachment member 60.

Deformation may be broadly distributed or may be localized to one or more of an attachment arm 122. The one or more of the attachment arm 122 may be a plurality of attachment arms corresponding to the plurality of fourth openings 118. The attachment arm 122 may have a radial arm surface 124 configured to interact with one or more other components of the sprocket assembly 40. For example, the radial arm surface 124 may be configured to radially engage with a radial carrier surface 126 of the carrier 56.

The attachment arm 122 may also include an arm inboard surface 123 configured to interact with another component of the sprocket assembly 40. For example, the arm inboard surface 123 may interact with the first sprocket 52 to align the first sprocket 52 with the attachment member 60. In an embodiment, the arm inboard surface 123 may engage circumferentially with the first sprocket 52.

Radial engagement of the carrier 56 with the attachment member 60 may align the carrier 56 with at least the attachment member 60. As the attachment member 60 may be aligned with or secured to the first sprocket 52, this radial engagement may also align the carrier 56 with the first sprocket 52. In an embodiment including the carrier 56, the alignment members 58 may align the second sprocket 54 with the first sprocket 52 without radially engaging the third openings 88.

Figure 10A:
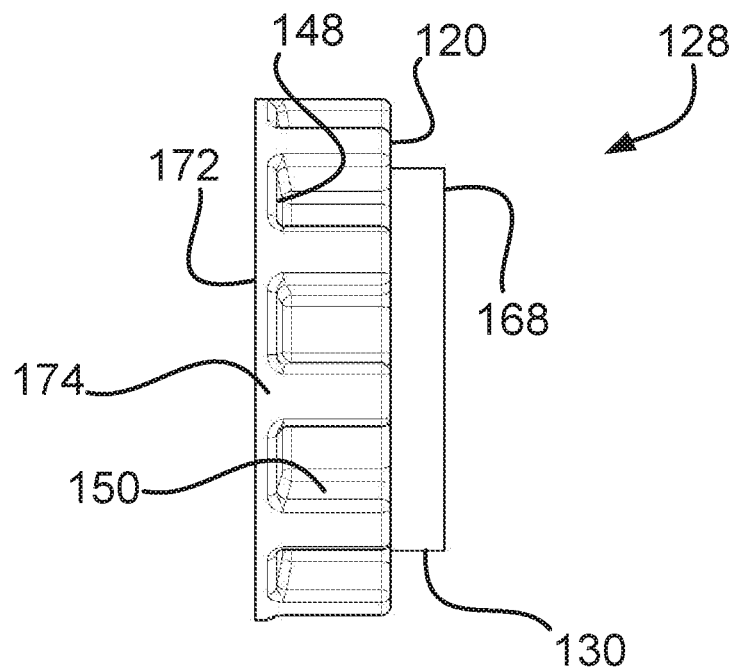
FIG. 10A is a side view of a component of the sprocket assembly of FIG. 2.
Figure 10B:
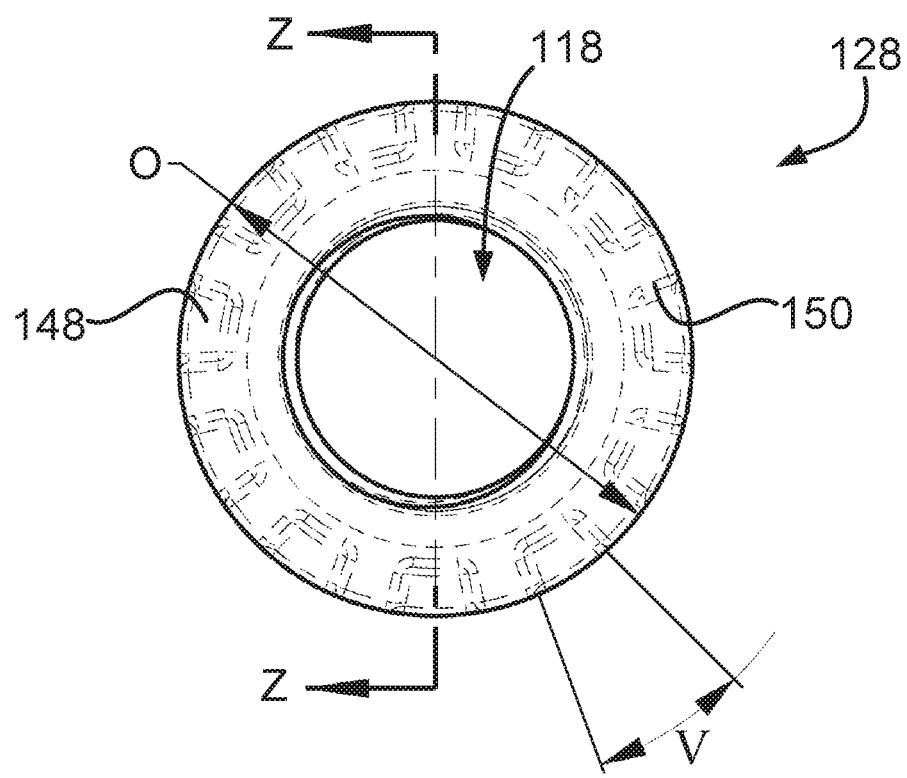
FIG. 10B is a top view of the component of FIG. 10A.

The fourth opening 118 may be formed separately or unitarily with the attachment member 60. The fourth opening 118 may be formed in the attachment member 60. For example, the fourth opening 118 may be formed in the attachment member through material removal techniques, such as machining, boring, or drilling. In an embodiment, the fourth opening 118 is formed in a separate piece that is joined with the attachment member. The separate piece may be joined using any technique. For example, the separate piece may be co-molded with, embedded in, threaded in, and/or adhesively mounted to the attachment member 60. In an embodiment, the fourth opening 118 may be disposed within an engagement member 128, for example as shown in FIGS. 10A and 10B, embedded in the attachment member 60.

Figure 6:
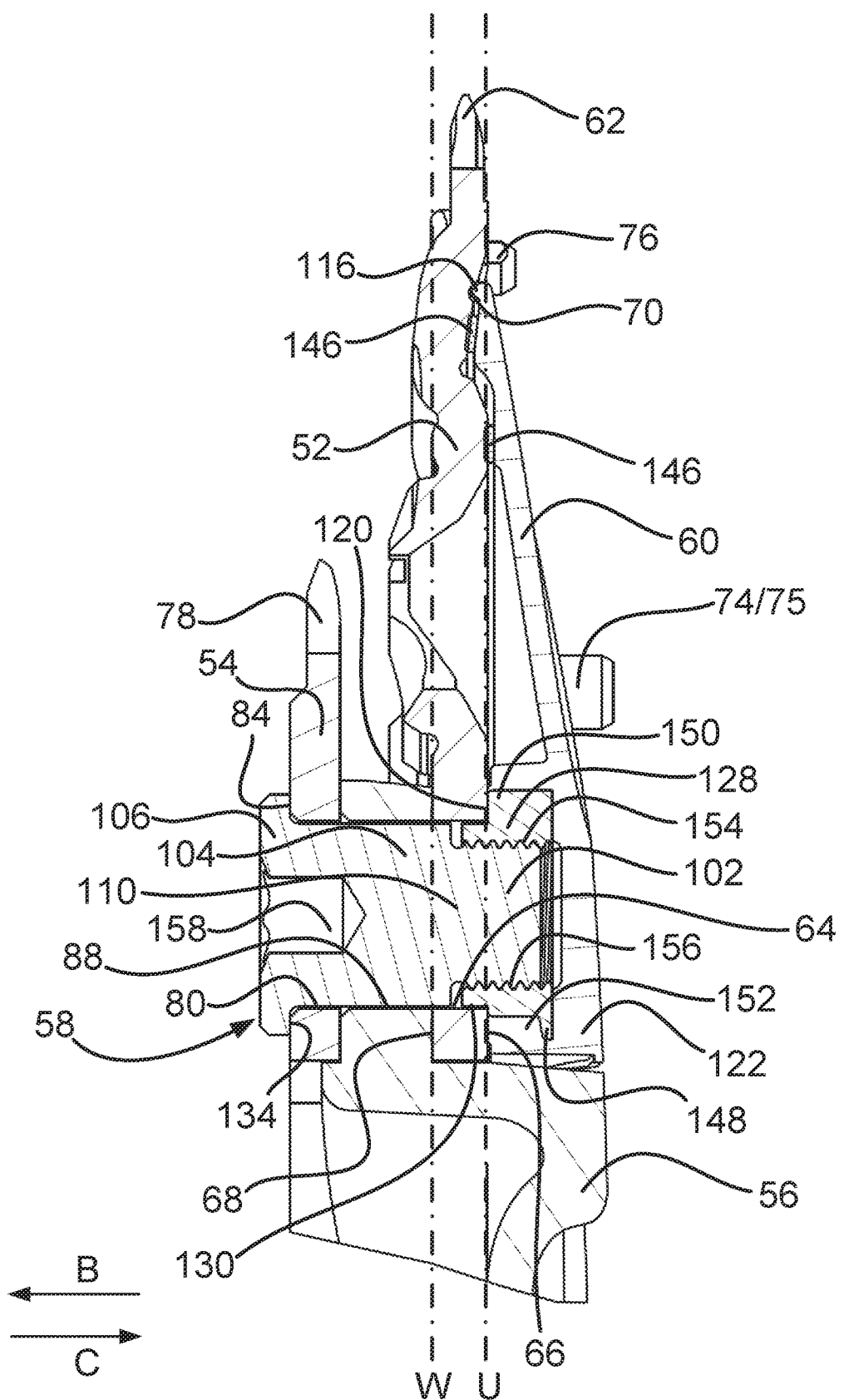
FIG. 6 is an enlarged view of the sectional view of FIG. 5.

The engagement member 128, for instance as shown in FIG. 6, may be configured to resist movement relative to the attachment member 60. For example, the engagement member 128 may be sized and shaped to remain axially fixed relative to the attachment member 60. The engagement member 128 may have one or more surfaces configured to resist movement relative to the attachment member 60. Such configurations may facilitate installation and removal of the alignment member 58 into and from the fourth opening 118 of the engagement member 128.

At least one of the engagement member 128 and the attachment member 60 may have one or more radial surfaces configured to engage one or more of another component of the sprocket assembly. For example, the engagement member 128 may have one or more of a radial engagement feature 130 sized and shaped to radially engage the first sprocket 52. In an embodiment, the first sprocket 52 may be aligned with the attachment member 60 through interaction of at least two of the radial engagement feature 130 with at least two of the first opening 64.

The attachment member 60 may be configured to be lightweight and flexible relative to the first sprocket 52. For example, the first sprocket 52 may be configured to transmit torque from the crank arm 46 to the chain 44. The attachment member 60 may be outside a load path between the crank arm 46 and the first teeth 62. The attachment member 60 may be constructed from a metallic, polymer, or composite material; or a combination of materials. For example, the attachment member 60 may be constructed from a moldable polymer such as nylon.

The attachment member 60 may also include one or more features configured to interact with other components of the sprocket assembly 40. For example, the attachment member 60 may include a fourth circumferential alignment feature 132 sized and shaped to interact with the first circumferential alignment feature 75. The attachment member 60 may be configured such that this interaction allows installation of the attachment member 60 to the first sprocket 52 in only one relative orientation.

At least one of the alignment members 58 and features of the carrier 56, the attachment member 60, the first sprocket 52, and/or the second sprocket 54 may be configured to rotationally align, or clock, the first and second sprockets 52, 54 relative to one another. The first and second sprockets 52, 54 may be similarly aligned about the axis L so that in an installed state both of the sprockets 52, 54 are aligned to rotate concentrically about the axis L.

The components of the sprocket assembly 40 are shown, as in FIG. 5, configured for axial engagement therebetween. In an embodiment, direct axial engagement between adjacent components results in indirect axial engagement between each of the alignment member 58, the second sprocket 54, the carrier 56, the first sprocket 52, and the attachment member 60. For example, an axial alignment surface 134 of the alignment member 58 may directly axially engage with the inboard second opening surface 84, the outboard second opening surface 82 may directly axially engage with the inboard third opening surface 92, the outboard third opening surface 90 may directly axially engage with the inboard first opening surface 68, and the outboard first opening surface 66 may directly axially engage with the inboard fourth opening surface 120. In such a way, indirect axial engagement of these components of the sprocket assembly 40 may be achieved.

Figure 4:
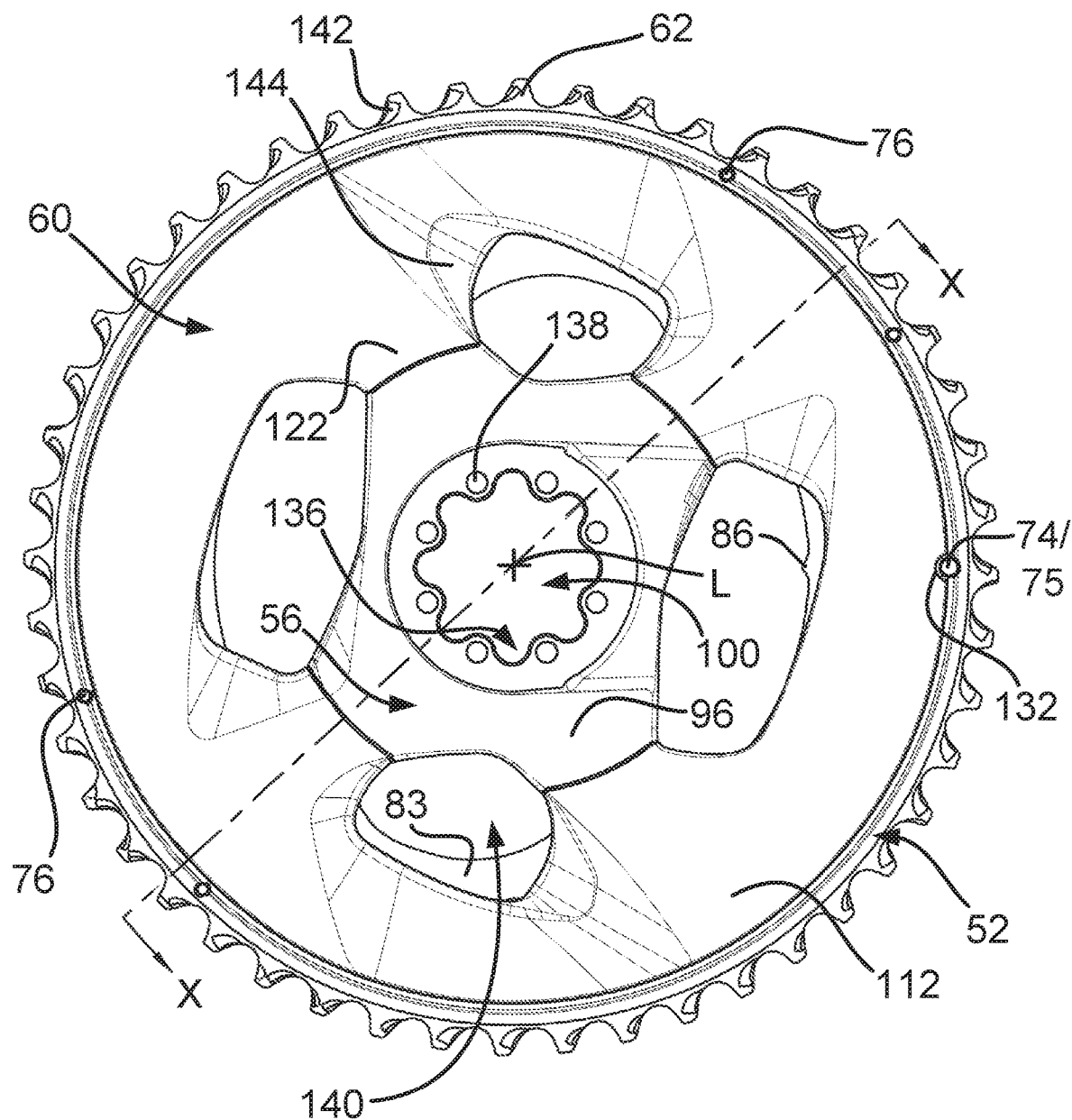
FIG. 4 is a side view of the sprocket assembly of FIG. 2.

FIG. 4 shows a view of the sprocket assembly 40 from the outboard direction C. The sprocket assembly 40 is shown in an installed state. Alignment of this installed state may be controlled by one or more components or features. For example, the first circumferential alignment feature 75, the second circumferential alignment feature 86, and the fourth circumferential alignment feature 132 are shown aligned. These features or associated components may be sized and shaped to facilitate a specific intended alignment. For example, the specific intended alignment may be controlled to facilitate shift feature interaction between the first and second sprockets 52, 54.

An embodiment includes one or more of a crank engagement feature 136. The crank engagement feature 136 may be configured to engage with a corresponding feature (not shown) of the crank arm 46. For example, the crank engagement feature 136 may be asymmetrically sized and shaped to permit installation of the crank arm 46 in one or more of an intended installation orientation.

The crank engagement feature 136 may or may not be configured to transmit torque between the crank arm 46 and the carrier 56. In an embodiment, the crank arm 46 may have the corresponding feature (not shown) sized and shaped to facilitate torque transmission with the crank engagement feature 136. In an alternative embodiment, the crank engagement feature 136 may be configured to engage the crank arm 46 only during installation. For example, the crank arm 46 may have the corresponding feature (not shown) sized and shaped with a clearance fit relative to the crank engagement feature 136 in an installed state.

In an embodiment, torque transfer between the crank arm 46 and the crank engagement feature 136 may be facilitated by one or more of a crank attachment feature 138. For example, the crank attachment feature 138 may be a plurality of threaded openings configured to receive crank fixing members (not shown) attached to the crank arm 46. Torque may be transferred between the carrier 56 and the crank arm 46 through interaction of the crank fixing members (not shown) and the crank attachment feature 138.

A degree of relative rotation between the crank arm 46 and the carrier 56 may be facilitated. For example, clearance around the crank engagement feature 136 may allow deflection detectable by one or more of a strain gauge (not shown). The strain gauge (not shown) may be operable to measure a value indicative of power input to the crank arm 46.

An embodiment may include one or more of a vacancy 140 through the sprocket assembly 40. The one or more of the vacancy 140 may be a plurality of vacancies. A plurality of vacancies 140 may be provided to reduce weight of the sprocket assembly 40.

One or more of an asymmetric tooth feature 142 and/or one or more of an asymmetric attachment feature 144 may be provided. Specific arrangement of asymmetric features may be relevant to shifting, retention, and/or aerodynamic performance of the sprocket assembly 40. Thus, alignment and/or clocking of the components of the sprocket assembly may be configured to control performance of the one or more of the asymmetric tooth feature and/or the one or more of the asymmetric attachment feature.

FIG. 5 shows a sectional view of the sprocket assembly 40 of FIG. 4 taken along section line X-X. Examples of axial engagement between associated components are visible. An example is the axial engagement between the third portion 106 of the alignment member 58 and the inboard second opening surface 84. Another example is the axial engagement of between the first portion 102 of the alignment member 58 and the engagement member 128.

An embodiment has an installed state in which the second portion 104 of the alignment member 58 passes through the second opening 80, the third opening 88, and partially through the first opening 64. The first portion 102 of the alignment member may extend in the inboard direction B past the engagement member 128 to facilitate tensioning between the alignment member 58 and the engagement member 128. An axial gap in the installed state between the second portion 104 and the engagement member 128 may also exist at least in part due to an axially extended configuration of the transition 110.

The embodiment of FIG. 5 shows alignment of the first sprocket 52, the second sprocket 54, the carrier 56, and the attachment member 60 facilitated by radial engagement with the second portion 104 of the alignment member 58. Each other component may radially engage with the second portion 104, or certain components may not. In an embodiment, two or more components of the sprocket assembly 40 may be secured together and aligned through radial engagement of only one of said components with the second portion 104. For example, the attachment member 60 and the first sprocket 52 may be secured or otherwise aligned together and only the first sprocket 52 may radially engage the second portion 104 through the first opening 64.

The shown embodiment depicts the engagement member 128 embedded in the attachment member 60. In an embodiment, the engagement member 128 may be overmolded with the attachment member 60. The engagement member 128 may be overmolded with a resin. For example, the engagement member 128 may be of aluminum alloy construction and overmolded with a polycarbonate resin forming the attachment member 60. The engagement member 128 may be unitary with the attachment member or may be otherwise attached. For example, the engagement member 128 may be threadably inserted into the attachment member 60 and/or adhesively mounted therein.

Various points of overlap between components may be provided as a result of specific configurations. For example, a radially-oriented plane, for example, a plane between plane W and plane U in FIG. 6, may intersect the first sprocket 52, the carrier 56, and the attachment member 60. In an embodiment, a portion of the first chainring 52 may axially protrude past a portion of the attachment member 60 in the outboard direction C. Axial overlap between components may be configured to increase rigidity or aid in torque transfer by decreasing or removing axial elements from a load path therebetween.

An embodiment of the anti-derailment feature 74 is shown also as an embodiment of the first circumferential alignment feature 75. The anti-derailment feature 74 may be configured to prevent certain instances of jamming of the chain 44 upon derailment. For example, the anti-derailment feature 74 may be sized and shaped correspondingly with the crank arm 46 such that the chain 44 cannot pass therethrough. In an embodiment, the anti-derailment feature 74 is sized and shaped to radially engage the chain 44 before the chain is axially engaged on more than one side thereof.

FIG. 6 shows an enlarged view of the sectional view of FIG. 5. One or more of an adhesive connection 146 may be included between components of the sprocket assembly 40. For example, the adhesive connection 146 may be disposed between at least part of the inboard engagement portion 116 of the attachment member and the outboard engagement portion 70 of the first sprocket 52. Additionally or alternatively, direct axial contact may exist between at least part of the inboard engagement portion 116 and the outboard engagement portion 70.

An embodiment of an axial securing feature 148 is depicted as part of the engagement member 128. The axial securing feature 148 is configured to resist removal of the engagement member 128 from the attachment member 60 from the inboard direction B. For example, the axial securing feature 148 may be sized and shaped to prevent relative axial movement between the engagement member 128 and the attachment member 60 without deforming at least one of the engagement member 128 and the attachment member 60.

An embodiment of an anti-rotation feature 150 is depicted as part of the engagement member 128. The anti-rotation feature 150 is configured to resist rotation of the engagement member 128 relative to the attachment member 60. For example, the anti-rotation feature 150 may be sized and shaped to prevent rotation of the engagement member 128 within the attachment member 60 without deforming at least one of the engagement member 128 and the attachment member 60.

At least one of the axial securing feature 148 and the anti-rotation feature 150 may be configured to interact with one or more of an engagement interaction feature 152 of the attachment member 60. There may be a configuration of the engagement interaction feature 152 configured to interact with the axial securing feature 148 and another configuration of the engagement interaction feature 152 configured to interact with the anti-rotation feature 150. In an embodiment, the engagement interaction feature 152 may be configured to interact with both the anti-rotation feature 150 and the axial securing feature 148. For example, the engagement interaction feature 152 may be sized and shaped to fill a space between adjacent embodiments of the anti-rotation feature 150 and axially inboard of an embodiment of the axial securing feature 148.

The engagement member 128 may be configured to directly axially engage with first sprocket 52. In the embodiment shown, the engagement member 128 and an adjacent portion of the attachment member 60 each directly axially engage with the outboard first opening surface 66 of the first sprocket 52. In this shown embodiment, the outboard first opening surface 66 is substantially planar, but other configurations may be implemented. For example, the outboard first opening surface 66 may be sized and shaped to axially engage with axially spaced apart configurations of the attachment member 60 and the engagement member 128, such as in a stepped or recessed configuration. Alternatively, the components may be configured such that at least one of the attachment member 60 and the engagement 128 do not axially engage with the outboard first opening surface 66. For example, the engagement member 128 may be axially unsupported from the outboard direction C.

Axial support of the engagement member 128 from the outboard direction C may facilitate the use of relatively lightweight materials. For example, axial support from the outboard direction C of the engagement member 128 may resist unintended forcible removal of the engagement member 128 from the attachment member 60 by threaded installation of the alignment member 58. Accordingly, the engagement member 128 and the attachment member 60 may be designed with relatively less structural resistance to axial removal of the engagement member 128 from the attachment member 60.

The embodiment illustrated in FIG. 6 depicts the third portion 106 of the alignment member 58 directly axially engaging the outboard second opening surface 82. Alternatively, there may be one or more intermediate components disposed between the third portion 106 and the second sprocket 54. For example, the intermediate member 108 may be provided, as in the embodiment illustrated in FIG. 7.

The embodiment of FIG. 6 depicts the transition 110 housed completely within the first opening 64. The transition 110 is disposed axially between the outboard first opening surface 66 and the inboard first opening surface 68. An outboard plane U may be defined as radially extending from the outboard first opening surface 66 and an inboard plane W may be defined as radially extending from the inboard first opening surface 68. The sprocket arrangement 40 may be configured such that the outboard plane U intersects the first portion 102 and the inboard plane W intersects the second portion 104. The transition 102 may be disposed between the outboard plane U and the inboard plane W in the installed state. At least part of the first portion 102 and/or at least part of the second portion 104 may be disposed between the outboard plane U and the inboard plane W.

The radial engagement feature 130 may radially engage with the first opening 64. In an embodiment, the radial engagement feature 130 aligns the attachment member 60 with the first sprocket 52 and the second portion 104 aligns the second sprocket 54 and the carrier 56 with the first sprocket 52.

Axial engagement as a result of tensioning the alignment member 58 and the engagement member 128 may maintain alignment of the components of the sprocket assembly. For example, such axial engagement may maintain a radially spaced apart relationship between the second portion 104 some or all of the openings 64, 80, 88. Such axial engagement may also maintain a radially spaced apart relationship between the radial engagement feature 130 and the first opening 64.

The first portion 102 of the alignment member 58 is shown in a male threaded configuration. The first portion 102 may be threadably engageable with the engagement member 128. For example, the engagement member 128 may be of a female threaded configuration to receive the male threaded configuration of the first portion. In an embodiment, a secured feature 154 of the first portion 102 is inserted into a securing feature 156 of the engagement member 128. At least one of the secured feature 154 and the securing feature 156 may be threaded. For example, the secured feature 154 may be a male thread and the securing feature 156 may be a female thread. Threaded engagement between the first portion 102 and the engagement member 128 may result in axial tension. For example, axial tension between the discussed surfaces of at least one of the first sprocket 52, second sprocket 54, the carrier 56, the alignment member 58, and the attachment member 60 may be a result of this threaded engagement.

The alignment member 58 may also include a tool engagement portion 158. The tool engagement portion 158 may be a recess or a protrusion of the alignment member 58. In an embodiment, the tool engagement portion 158 may facilitate socketed engagement. For example the, tool engagement portion 158 may be a recess sized and shaped to receive a hexagonal or similar male tool feature or a protrusion to receive a hexagonal or similar female tool feature.

The embodiment shown in FIG. 7 differs from the embodiment shown in FIG. 6 in that the intermediate member 108 is provided. The intermediate member 108 may be disposed between the alignment member 58 and another component of the sprocket assembly 40. For example, intermediate member 58 may be disposed axially between the alignment member 58 and the second sprocket 54. The intermediate member 108 has an outboard intermediate surface 160 and an inboard intermediate surface 162. In an embodiment, the outboard intermediate surface 160 directly axially engages with the inboard second opening surface 84 of the second sprocket 54 and the inboard intermediate surface 162 directly axially engages with the axial alignment surface 134 of the alignment member 58.

Figure 8A:
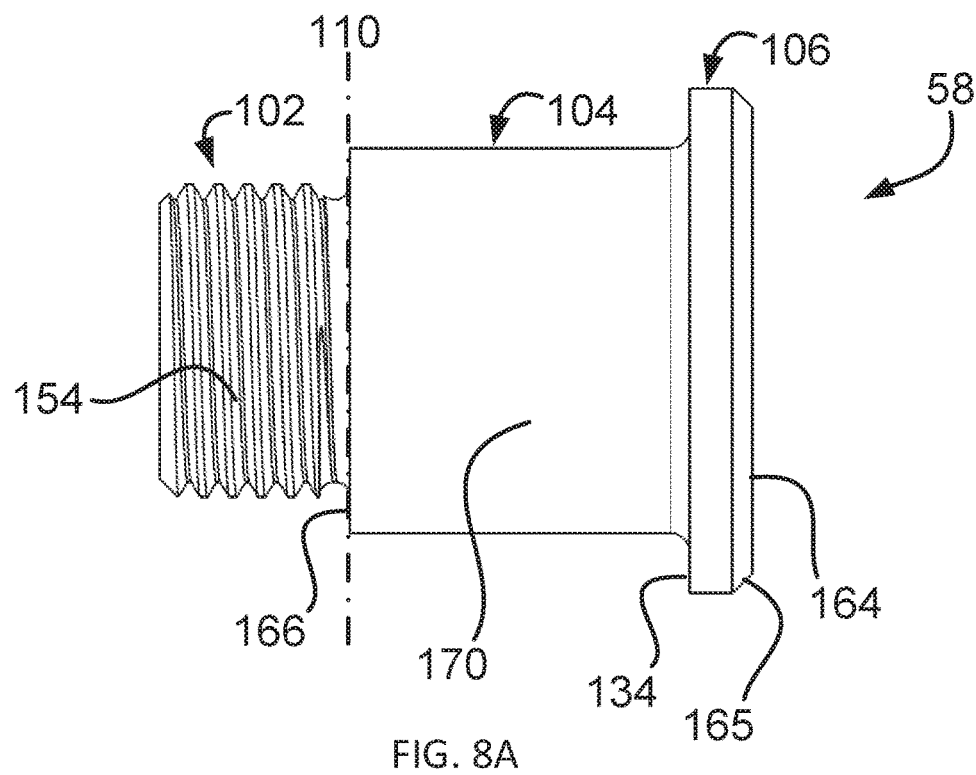
FIG. 8A is a side view of a component of the sprocket assembly of FIG. 2.

FIG. 8A shows a side view of the alignment member 58. The third portion 106 is shown bound axially by the axial alignment surface 134 on one side and by an inboard alignment surface 164 on the opposing side. The inboard alignment surface 164 may be the innermost part of the sprocket assembly 40 in an installed state. In an embodiment, the inboard alignment surface 164 is sized and shaped to protrude minimally in the inboard direction B, for instance to avoid contact with the frame 12.

The second portion 104 is shown bound axially by the third portion 106 on one side and by an alignment transition surface 166 on the opposing side. The alignment transition surface 166 may be configured to interact with another surface or may be configured to avoid axial contact with another surface. For example, the alignment transition surface 166 may be sized and shaped to axially resist further installation of the alignment member 58, for instance to discourage overtightening. Alternatively, the alignment transition surface 166 may be sized and shaped to avoid contact with another surface, for instance to facilitate installation of the alignment member 58 to a precise torque value.

The transition 110 is shown indicated by a plane 110 in FIG. 8A but may be otherwise represented. For example, the transition 110 may be defined as a portion of the alignment member 58 disposed between the first portion 102 and the second portion 104. In an embodiment, the transition 110 is defined as a portion of the alignment member 58 disposed between the first portion 102 and the second portion 104 and not including at least one physical characteristic of each of the adjacent portions. For example, the transition 110 may lack threading of the adjacent part of the first portion 102 and may lack the enlarged second diameter Q of the adjacent part of the second portion 104. In an embodiment, the transition 110 is frustoconical, decreasing in size from the second diameter Q to the inner thread diameter T relative to changing position along the along the axial length of the alignment member 58 from the second portion 104 towards the first portion 102.

The second portion 104 is shown having a radial alignment feature 170. The radial alignment feature 170 is configured to radially engage with at least one of the first, second, and third openings 64, 80, 88. In an embodiment, the radial alignment feature 170 may be configured to radially engage with each of the first, second, and third openings 64, 80, 88. The radial alignment feature 170 may be a smooth annular surface or may have surface features. In an embodiment, the radial alignment feature 170 is free from any surface feature including a recess or protrusion having a radial dimension greater than the difference between the first diameter P and the inner thread diameter T.

Figure 8B:
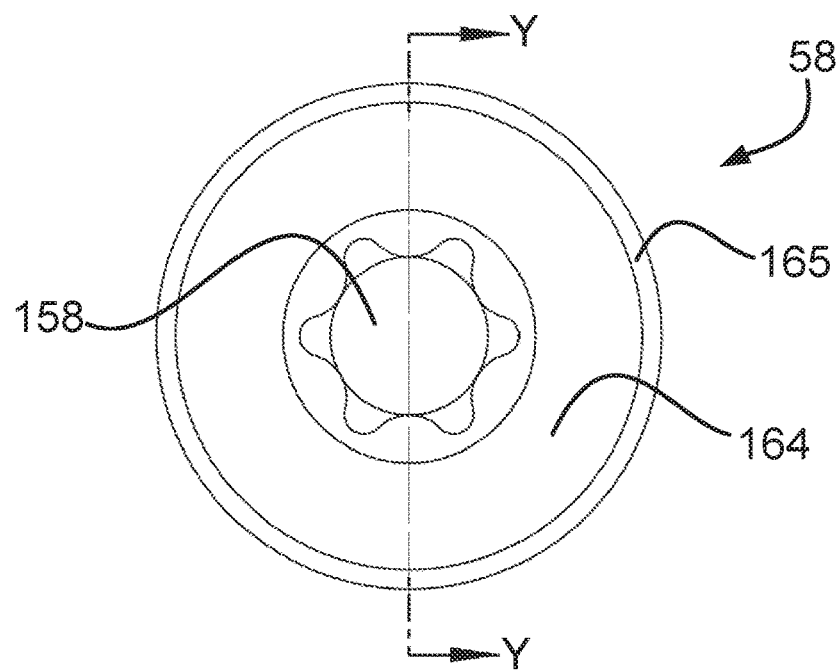
FIG. 8B is a top view of a component of FIG. 8A.

FIG. 8B shows a top view of the alignment member 58 of FIG. 8A. The tool engagement portion 158 is shown as a recess in the inboard alignment surface 164. The tool engagement portion 158 may be otherwise configured or omitted. For example, the inboard alignment surface 164 may be configured for tool-less operation. In an embodiment, the third portion 106 is of a knurled configuration to facilitate manual installation of the alignment member 58.

The alignment member 58 may be made from various materials. For example, all or part of the alignment member 58 may be constructed from an aluminum alloy, a steel alloy, a composite, a polymer, or combinations thereof. The alignment member 58 may be molded, extruded, cast, machined, forged, printed, and/or created by another suitable technique.

Figure 9:
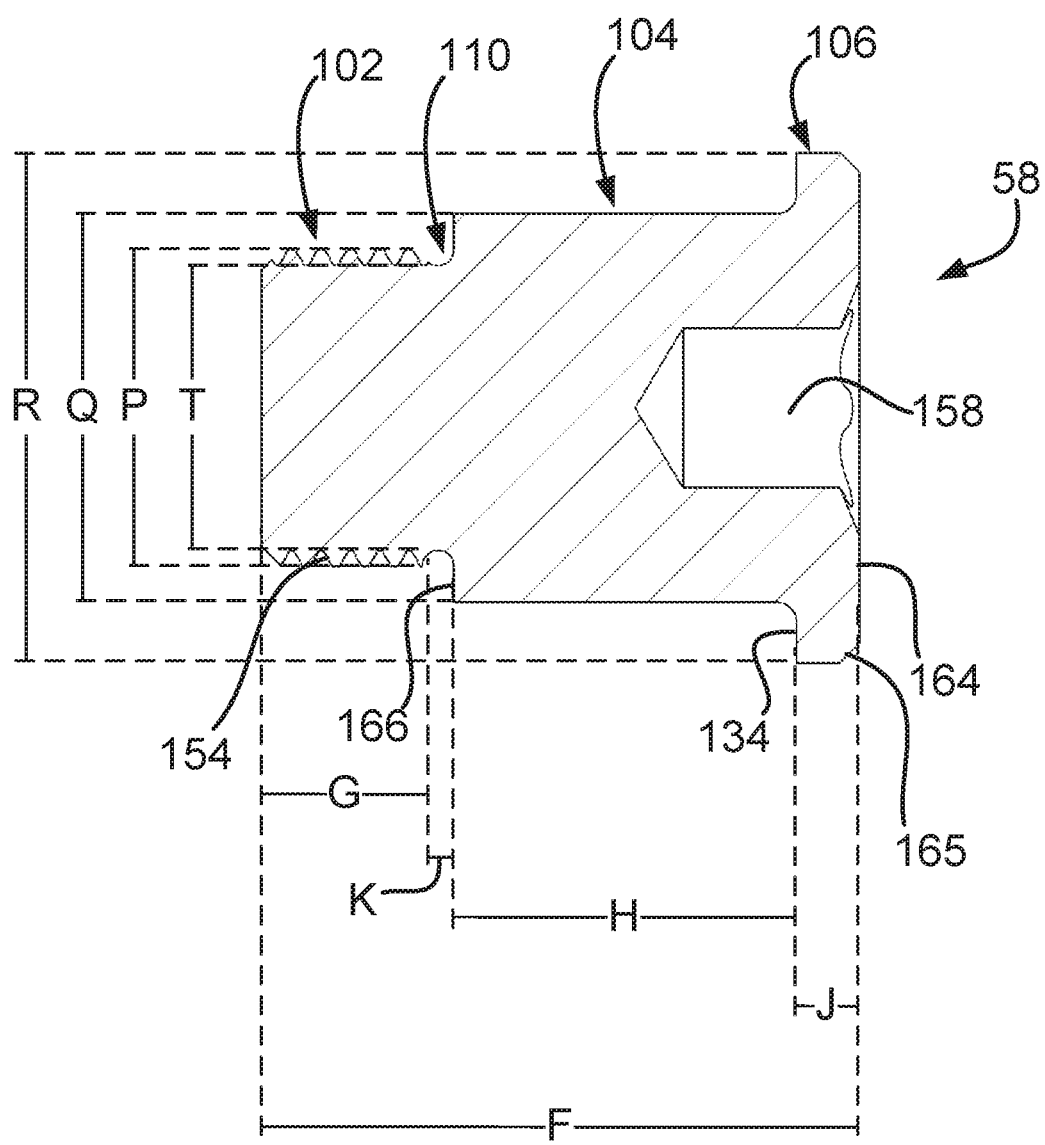
FIG. 9 is a sectional view of the component of FIG. 8A, taken along section line Y-Y of FIG. 8B.

FIG. 9 shows a sectional view of the alignment member 58 of FIG. 8A taken along section line Y-Y of FIG. 8B. The third diameter R of the third portion 106 is shown as greater than the second diameter Q of the second portion 104. The second diameter Q of the second portion is shown as greater than the first diameter P of the first portion 102. The inner thread diameter T is shown as less than the first diameter P of the first portion 102, representing threading therein. The difference between the second diameter Q and the first diameter P may be greater than the difference between the first diameter P and the inner thread diameter T. For example, a relatively small thread depth may be implemented.

In an embodiment, the difference between the second diameter Q and the first diameter P may be approximately 2 millimeters. For example, the first diameter P may be approximately 8 millimeters and the second diameter Q may be approximately 10 millimeters. The difference between the third diameter R and the second diameter Q may be greater than the difference between the second diameter Q and the first diameter P. For example, the difference between the third diameter R and the second diameter Q may be approximately 3 millimeters and the difference between the second diameter Q and the first diameter P may be 2 millimeters. In an embodiment, the third diameter R is approximately 13 millimeters.

The transition 110 may be defined as a portion of the alignment member 58. For example, the transition 110 may have a transition length K. Additional component lengths may be defined first length G of the first portion 102, the second length H of the second portion 104, and the third length J of the third portion 106. An alignment member length F may describe the sum of each of the component lengths, G, H, J, K.

The second length H may be the greatest of the component lengths G, H, J, K. For example, the second length H may be greater than the first length G, which may be greater than the third length J, which may be greater than the transition length K. In an embodiment, the third length J may be less than 2 millimeters. For example, the third length J may be 1.6 millimeters. The transition length K may also be zero, as the transition 110 may be defined as a plane. In an embodiment, the second length H may be greater than half of the alignment member length F. For example, the second length H may be approximately 9 millimeters and the alignment member length F may be approximately 15 millimeters.

FIG. 10A shows a side view of the engagement member 128. The engagement member 128 is shown with an axially outermost point defined on an engagement base surface 172. The engagement base surface 172 may be configured to interact with the attachment member 60. For example, the engagement base surface 172 may be axially engaged with the attachment member 60. In an embodiment, the engagement base surface 172 may be bonded to the attachment member 60.

The engagement member 128 is shown with an axially innermost point defined on an engagement transition surface 168. The engagement transition surface 168 may be configured to interact with another component. For example, the engagement transition surface 168 may be configured to axially engage with the alignment transition surface 166. In an embodiment, the engagement transition surface 168 and the alignment transition surface 166 remain spaced apart in an installed state, for example as shown in FIG. 6.

FIG. 10B shows a top view of the engagement member 128 of FIG. 10A.

Pluralities of the anti-rotation feature 150 and the axial securing feature 148 are shown disposed circumferentially about the fourth opening 118. Such a plurality of the anti-rotation feature 150 may be organized in one or more of an opposing pair. For example, a clockwise-facing configuration of the anti-rotation feature 150 may correspond to a counterclockwise-facing configuration of the anti-rotation feature 150. An opposing pair of the anti-rotation feature 150 may be separated from one from the other by a circumferential distance V. The circumferential distance V may be less than half of circumferential distance about the fourth opening 118. In an embodiment, the circumferential distance V is one of ¼, ⅒, 1/15, and 1/20 of the circumferential distance about the fourth opening 118.

Multiple opposing pairs may be separated by a similar circumferential distance; less than, greater than, or equal to the circumferential distance V. For example, a clockwise-facing configuration of the anti-rotation feature 150 of one opposing pair may be spaced apart from a counterclockwise-facing configuration of the anti-rotation feature 150 of an adjacent opposing pair by a circumferential distance less than the circumferential distance V.

The anti-rotation feature 150 or any pluralities thereof may be configured as a recess or protrusion, or pluralities of recesses and/or protrusions. Relative depth of such a recess or protrusion may be configured to engage the attachment member 60. For example, the anti-rotation feature 150 may have an anti-rotation depth E. In an embodiment, the anti-rotation depth E represents depth of a recess configuration of the anti-rotation feature 150 relative to a sixth diameter O.

The engagement member 128 may be made from various materials. For example, all or part of the engagement member 128 may be constructed from aluminum alloy, steel alloy, composite, and/or polymer. The engagement member 128 may be molded, extruded, cast, machined, forged, printed, and/or created by another suitable method.

Figure 11:
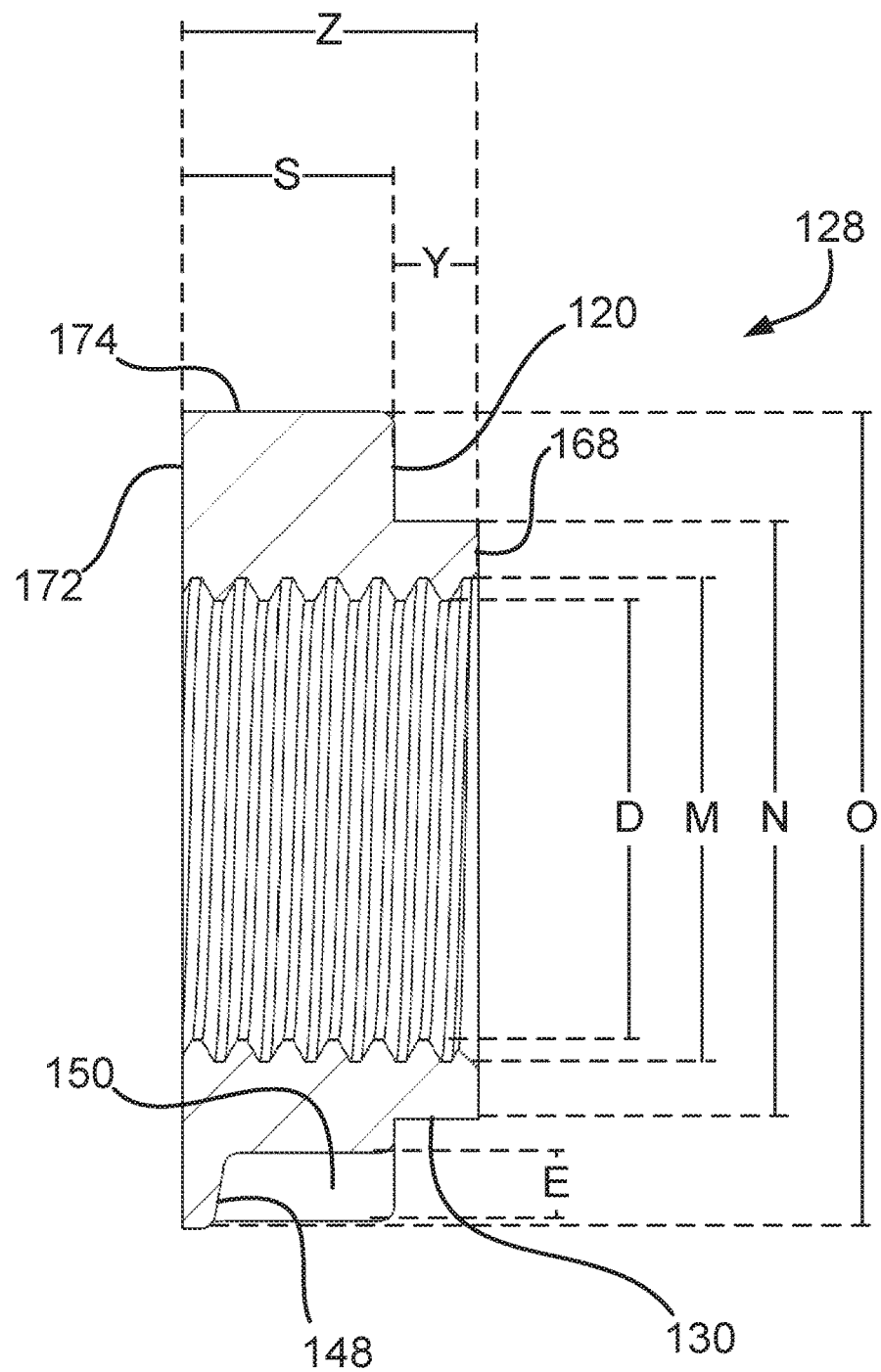
FIG. 11 is a sectional view of the component of FIG. 10A, taken along section line Z-Z of FIG. 10B.

FIG. 11 is a sectional view of the nut of FIG. 10A taken along section line Z-Z of FIG. 10B. The sixth diameter O is shown as greater than a fifth diameter N, which is shown as greater than a fourth diameter M, which is shown as greater than an outer thread diameter D. The outer thread diameter D may correspond with the first diameter P. For example, the outer thread diameter D and the first diameter P may be approximately equal or the outer thread diameter D may be slightly greater than the first diameter P.

The difference between the sixth diameter O and the fifth diameter N may be greater than the difference between the fifth diameter N and the fourth diameter M and/or the difference between the fifth diameter N and the outer thread diameter D. For example, a relatively large diameter portion containing at least one of the anti-rotation feature 150 and the axial securing feature 148 may be provided.

In an embodiment, the fifth diameter N of the engagement member 128 may correspond to the second diameter Q of the alignment member 58. For example, the fifth diameter N and the second diameter Q may be substantially equal or the second diameter Q may be slightly less than the fifth diameter. In an embodiment; first, second, and third openings 64, 80, 88 having substantially uniform diameters may radially engage with one or both of the radial alignment feature 170 having the second diameter Q and the radial engagement feature 130 having the fifth diameter N. For example, the radial engagement feature 130 may radially engage with the first opening 64 and the radial alignment feature 170 may radially engage with the first opening 64, the second opening 80, and the third opening 88.

The axial dimensions of the engagement member 128 may be defined within an engagement member length Z. In an embodiment, each axial end of the engagement member may have an opening therethrough. For example, the engagement base surface 172 and the engagement transition surface 168 are each interrupted by the opening having the outer thread diameter D. The engagement member length Z may be defined as the axial distance between the engagement base surface 172 and the engagement transition surface 168. A sixth length S may be greater than a fifth length Y. In an embodiment, the sixth length S may be more than double the fifth length Y. For example, the sixth length S may be approximately 1.5 millimeters and the fifth length Y may be approximately 3.5 millimeters. The fifth length Y may be relatively short to facilitate radial engagement of both the radial engagement feature 130 and the radial alignment feature 170 with the first opening 64. The sixth length S may be relatively long to increase anti-rotation and/or axial security of the engagement member 128 within the attachment member 60.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A sprocket assembly for a bicycle, the sprocket assembly comprising:
    a first sprocket configured for rotation about a rotation axis of the bicycle;
    an attachment member having a plurality of engagement members fixed relative thereto and disposed outboard of the first sprocket;
    a second sprocket disposed inboard of the first sprocket; and
    a plurality of alignment members engaged with the plurality of engagement members through a plurality of first openings in the first sprocket and a plurality of second openings in the second sprocket, the plurality of alignment members including a first portion having a first diameter, a second portion having a second diameter greater than the first diameter, and a third portion having a third diameter greater than the second diameter;
    wherein each of the plurality of alignment members are formed as a single piece including the first portion, the second portion, and the third portion, the first portion having a male threaded secured feature and the second portion including an alignment feature with a smooth annular surface configured to radially and directly engage the plurality of the first openings and the plurality of second openings.

2. The sprocket assembly of claim 1, each of the plurality of engagement members comprises an engagement feature configured to radially engage the first opening.

3. The sprocket assembly of claim 1, further comprising a carrier assembly disposed between the first and second sprockets, wherein the carrier assembly comprises a plurality of third openings, the plurality of third openings configured to radially engage the alignment feature of each of the plurality of alignment members.

4. The sprocket assembly of claim 1, wherein each of the plurality of alignment members having the secured feature is threadably engaged with a securing feature of the engagement member outboard of the first opening.

5. The sprocket assembly of claim 4, wherein a length of the alignment feature is greater than a length of the secured feature.

6. The sprocket assembly of claim 4, wherein an inboard surface of each of the plurality of engagement members axially engages the first sprocket.

7. The sprocket assembly of claim 1, wherein each of the plurality of engagement members is embedded in the attachment member.

8. The sprocket assembly of claim 7, wherein each of the plurality of engagement members comprises at least one of an anti-rotation feature sized and shaped to fix positions of each of the plurality of engagement members relative to the attachment member in a rotational direction.

9. The sprocket assembly of claim 8, wherein each of the engagement members comprises at least one of an axial securing feature sized and shaped to fix positions of each of the plurality of engagement members relative to the attachment member in an axial direction.

10. A sprocket assembly for a bicycle, the sprocket assembly comprising:
a first sprocket having a first opening, the first opening having an outboard surface and an inboard surface;
a second sprocket inboard of the first opening;
a plurality of single piece alignment members, each comprising:
a first portion having a first diameter,
a second portion having a second diameter greater than the first diameter,
a third portion having a third diameter greater than the second diameter, and
a transition disposed between the first portion and the second portion; and
an attachment member outboard of the first opening, the attachment member comprising:
an inboard engagement portion axially engaged with the first sprocket, and
a plurality of engagement members engaged with the plurality of alignment members;
wherein the transition is disposed between the inboard surface and the outboard surface, and the third portion is axially engaged with the second sprocket; wherein the first portion having a male threaded secured feature and the second portion including an alignment feature with a smooth annular surface configured to radially and directly engage the first opening of the first sprocket and a second opening of the second sprocket.

11. The sprocket assembly of claim 10, wherein each of the plurality of alignment members has an alignment member length, the first portion has a first length, and the first length is greater than one half of the alignment member length.

12. The sprocket assembly of claim 10, further comprising an intermediate feature disposed between the first sprocket and sprocket interface portion.

13. The sprocket assembly of claim 12, wherein the intermediate feature is an adhesive.

14. The sprocket assembly of claim 10, further comprising an intermediate member disposed between second sprocket and the third portion.

15. The sprocket assembly of claim 10, wherein the second sprocket has a plurality of second openings, each of the plurality of alignment members passing through one of the plurality of second openings.

16. The sprocket assembly of claim 15, further comprising a carrier disposed between the first opening and the second opening.

17. A sprocket assembly for a bicycle, the sprocket assembly comprising:
an alignment member formed as a single piece;
a first sprocket having a first opening; a second sprocket disposed inboard of the first sprocket; and
at least one of an attachment member disposed outboard of the first opening, the attachment member having an engagement member embedded therein, the engagement member comprising at least one of an anti-rotation feature sized and shaped to stop rotation of the engagement member relative to the attachment member; wherein the alignment member including a first portion having a first diameter, a second portion having a second diameter greater than the first diameter, and a third portion having a third diameter greater than the second diameter; wherein the first portion having a male threaded secured feature and the second portion including an alignment feature with a smooth annular surface configured to radially and directly engage the first opening of the first sprocket and a second opening of the second sprocket;
wherein the alignment member passes through the first opening and engages the engagement member.

18. The sprocket assembly of claim 17, wherein the engagement member further comprises at least one of an axial securing feature sized and shaped to stop axial movement of the engagement member in at least an inboard direction relative to the attachment member.

* * * * *